UNITED STATES PATENT OFFICE 2,063,854

POLYBASIC ALIPHATIC ACID-POLYHYDRIC ALCOHOL RESIN

Israel Rosenblum, Jackson Heights, N. Y.

No Drawing. Application January 15, 1934, Serial No. 706,774

20 Claims. (Cl. 260—8)

The present invention relates to resins of the polydric alcohol-polybasic acid type and particularly to resins composed of polyhydric alcohol, phthalic acid, a polybasic aliphatic acid and a fatty oil or fat acid.

It is a general object of the present invention to produce soluble alkyd resins of the specific type above mentioned which are suitable for use in varnishes, enamels, paints and lacquers and produce hard and flexible films of a superior degree of paleness, permanence of color and adhesion to various kinds of surfaces, particularly metallic surfaces.

Various resins composed of a polyhydric alcohol, generally glycerol, phthalic acid and an acid derived from a fatty oil or fat are known. A number of patents describing processes involving the reaction between these materials indicate that the phthalic acid can be replaced by various polybasic aliphatic acids, such as maleic, malic, succinic, tartaric, etc. but none of these patents, so far as known to me, presents any specific examples wherein the polybasic aliphatic acid is used in place of phthalic or describes any detailed process yielding a commercial resin upon replacement of the phthalic acid with the polybasic aliphatic acid.

I have found that contrary to the intimations in these prior patents, the phthalic acid cannot be replaced arbitrarily and at will by a polybasic aliphatic acid in the known methods of producing alkyd resins. Extensive investigations have shown that the replacement of the phthalic acid with a polybasic aliphatic acid, either wholly or to such an extent that the proportion of the latter to the phthalic acid exceeds a certain maximum, results in the formation of two immiscible layers which cannot be made to fuse together and form a homogeneous resin even after prolonged heating at elevated temperatures. Continued heating of such a mixture results ultimately in hardening and even charring of the lower layer, which consists mainly of the ester of the polybasic aliphatic acid.

According to the processes described in the patents referred to above, the polyhydric alcohol is reacted simultaneously with all of the acids, or is reacted first with the polybasic acid or acids and finally with the monobasic fatty oil acid. I have found that both of these processes result in the formation of two immiscible layers when the amount of polybasic aliphatic is above a certain amount in relation to the phthalic or wholly replaces the latter. My investigations have, however, shown that polybasic aliphatic acids, such as maleic acid, can be incorporated in a polyhydric alcohol-phthalic acid fatty oil or fat acid resin in an amount which would cause the production of two immiscible layers if the reaction were conducted in the manner heretofore suggested, provided that the reaction is conducted in two steps and in a certain specific order.

According to the present invention, the polyhydric alcohol is caused to react first with the fatty oil or fat acid so as to produce a partial ester of the polyhydric alcohol, preferably the mono-ester, whereupon such ester is reacted with a polybasic aliphatic acid alone, or with a mixture of such acid and phthalic acid in such relative proportions as would produce two immiscible layers were all of the ingredients to be reacted simultaneously or were the polyhydric alcohol to be reacted first with the polybasic acid or acids. Thus, according to the present invention, I am able to produce a satisfactory resin containing, for example, about 3 mols or more of maleic acid to 1 mol. of phthalic acid, a proportion which would yield a useless mass consisting of two immiscible layers which may be either liquid or one or both solid and insoluble one in the other if the glycerol, maleic acid, phthalic acid and monobasic fatty oil or fat acid were to be reacted simultaneously; or where the polybasic acids and the oil or fat acid are heated first and the glycerol subsequently introduced and the mixture further heated to about 200° C. or above.

The present invention thus provides a process for incorporating into a polyhydric alcohol-polybasic acid resin such amounts of polybasic aliphatic acid as would yield non-homogeneous and practically useless masses where the ingredients reacted in known ways. My improved process will yield homogeneous, fusible and soluble resins when the molecular proportion of the maleic acid, for example, to phthalic acid is about 3 and upward, it being understood that the higher the proportion of maleic or equivalent acid to the phthalic acid the more readily do two layers form when the reaction takes place according to known methods and the more quickly does the lower layer become insoluble and infusible.

According to one mode of carrying out the invention 1 mol. of glycerol is reacted with 1 mol. of linoleic acid to produce the monolinoleate. One mol. of this partial ester is then reacted with, for example, ¾ mol. of maleic acid and ¼ mol. of phthalic acid and yields a homogeneous resin which is very pale in color and adheres very strongly to metallic and other surfaces. Similarly, a satisfactory resin can be obtained from 1 mol. of glycerol, 1 mol. of linoleic acid, ¾ mol. of succinic acid and ¼ mol. of phthalic acid, provided that the glycerol is first reacted with the linoleic acid. In both cases, if all the materials were mixed and reacted together from the beginning, or if the glycerol were reacted first with the phthalic and maleic or succinic acids, two layers would be formed which could not be made to fuse together even by prolonged heating, the lower layer ultimately hardening and darkening.

In place of the maleic and succinic acids there may be employed malic, fumaric, tartaric, and other polybasic aliphatic acids or mixtures thereof. The linoleic acid may be replaced in whole or in part by the acids of soya bean oil, cottonseed oil, menhaden oil, tung oil, and other drying and non drying oils and of fats.

The glycerol may be replaced by polyglycerols and other polyhydric alcohols, preferably those containing at least three basic hydroxyl groups.

The invention will be described in greater detail with the aid of the following examples which illustrate several ways of carrying out the invention.

*Example 1*

The monolinoleic acid ester of glycerol was prepared in known manner and the following materials were then reacted:

|  |  | Grams |
|---|---|---|
| Monolinoleic glycerol ester | (1 mol.) | 354 |
| Phthalic anhydride | (¼ mol.) | 37 |
| Maleic acid | (¾ mol.) | 87 |

On heating to approximately 200° C. with vigorous stirring a clear solution was obtained without the formation of separate layers and the reaction was finished in about 1 hour. With higher temperatures, shorter periods of reaction will be required and vice versa.

The plastic resin so obtained was soluble in coal tar solvents and mixtures of coal tar solvents with mineral spirits, and also in varnish oils in definite proportions at the usual temperatures (that is, not considerably above 100-120° C., and considerably below the temperature at which the oil is hydrolyzed and its acids esterified). The resin was miscible also with other resins and varnishes giving solutions suitable to be used as such or pigmented to form enamels, the coating compositions being characterized by excellent retention of color on air drying as well as baking.

*Example 2*

|  | Grams |
|---|---|
| Monolinoleic glycerol ester | 354 |
| Phthalic anhydride | 60 |
| Maleic acid | 140 | were heated to about 200° C. with vigorous stirring. A uniform clear material was obtained in about 1 hour, and yielded a plastic resin at room temperature, the properties of which were similar to those of the resin obtained according to Example 1. As in Example 1, the reaction time could be reduced by raising the temperature, and vice versa. The molecular ratio of maleic acid to phthalic acid was 3:1, as in Example 1.

*Example 3*

|  |  | Grams |
|---|---|---|
| Monolinoleic glycerol ester | (1 mol.) | 354 |
| Phthalic anhydride | (¼ mol.) | 37 |
| Succinic acid | (¾ mol.) | 89 | were heated to about 230° C. A uniform clear material was obtained and the reaction was finished in about 2 hours, yielding a plastic resin whose general characteristics of solubility and compatability with oils and resins were similar to those of the resin obtained in Example 1.

*Example 4*

|  | Grams |
|---|---|
| Monolinoleic glycerol ester | 354 |
| Phthalic anhydride | 66 |
| Succinic acid | 131 | on heating to about 230° C. gave a clear uniform material which after about 2 hours heating was converted into a plastic resin, soluble in coal tar solvents and mixtures of coal tar solvents with mineral solvents, and also in varnish oils in definite proportions. The resin was compatible with other resins, natural and synthetic, and could be used either alone or in combination with oils, resins and varnishes, as clear coatings or pigmented as enamels. Attempts to produce the same resin by heating simultaneously the component parts of monolinoleic ester, namely linoleic acid and glycerine in molecular porportions, and the corresponding amounts of the dicarboxylic acids; or by first heating all the acids to 160-180° C. and then adding the glycerine and heating further were all unsuccessful. In each case cloudy mixtures were obtained at first; even on further heating and on reaching 230° C., despite good stirring, immiscible layers formed or flocculent solid matter settled on the bottom of the reaction vessel. The lower layer soon turned into an infusible gel and on continued heating charred.

As already indicated, by the expression "solution in oil", I mean solution in the ordinary sense and not reaction in which the oil is decomposed into free fatty acids, i. e., hydrolized. The minimum molecular proportion between maleic and phthalic acids of about 3:1 holds for all commercial proportions of linoleic to glycerol; that is, for all such proportions of linoleic acid to glycerol and of combined mono-linoleic glycerol ester to polybasic aliphatic and phthalic acids as will produce a final resin which is soluble in or compatible with oils at ordinary temperatures of solution (100-120° C.), that is, below oil hydrolysis and fatty acid esterification temperatures.

In general, when less linoleic acid is employed with glycerol, a polybasic aliphatic acid and phthalic acid (the latter acids in the molecular proportion of 3:1 or higher) in known processes, the tendency toward the formation of two immiscible layers is diminished, but at the same time the solubility and compatibility with oils and other solvents such as mineral spirits and solvent naphtha is reduced until upon the total elimination of the linoleic acid the compatibility with oils at usual solution temperatures and also the solubility in common solvents, such as solvent naphtha or mixtures of the same with other solvents, is entirely destroyed.

The following examples illustrate the invention as applied to resins containing no phthalic acid, the molecular ratio of the polybasic aliphatic acid to the phthalic acid being thus infinity. With this type of resin an unusually low acid number can be obtained, but when maleic acid is employed there must first be formed the di-acid ester of the polyhydric alcohol, preferably glycerol, while in the case of succinic acid either the mono or di-acid ester can first be formed. As in the examples given above, no such excess of polyhydric alcohol is employed or of partial esters as will yield a product containing free hydroxyl groups, such hydroxyl groups in the final resin being undesirable as they impair the drying qualities of the resin.

*Example 5.*—1680 grs. (approximately 6 mols) of soya bean oil fatty acids are heated to about 230–240° C. or somewhat higher with 285 grs. (approximately 3 mols) of glycerol until a glycerol diester is obtained having an acid number of about 1. There are then added 1½ gram-molecular weights of maleic acid (174 grs.) or maleic anhydride (147 grs.) and the heating is continued at a temperature of 230–240°, or somewhat lower or higher, the mass being continually stirred either mechanically or by bubbling an inert gas therethrough. After about 15 to 20 hours heating the product becomes highly viscous and has an extremely low acid number (about 4–8). The product is plastic in character at room temperatures, is soluble in mineral spirits, and presents a very desirable resin because of its practically neutral character as it can be mixed with basic pigments (and of course also with other types of pigments) for the manufacture of enamels and paints. It is also substantially free of hydroxyl groups and accordingly dries quickly both in air and on baking.

*Example 6.*—The same procedure as set forth in Example 5 is followed except that instead of soya bean fatty oil acid, wood oil fatty acids or linseed oil fatty acids, or mixtures of the different fatty oil acids and fat acids, or the acids obtained from cotton seed oil or perilla oil are employed. There may also be employed the acids of the following oils, either alone or in admixture, corn oil, sunflower oil, castor oil, olive oil, rapeseed oil, rubber seed oil, fish oil, etc., the properties of the final product depending to some extent upon the character of the fatty oil acid used.

The mixed ester resins produced in accordance with the above-described process are soluble also in benzol, turpentine and other common varnish solvents.

The plastic resins above obtained can be mixed with varnish oils or with varnishes and impart thereto paleness of color and superior durability and water-proofness.

Care should be taken not to use oxidized fatty oil acids, as I have found that the partial glycerol esters made from such acids have only a slight solvent power for maleic acid, so that a large part of the maleic acid can not be made to enter into reaction to form a neutral or nearly neutral product, but form rather a separate layer. In addition, oxidation of the fatty acids, especially at elevated temperatures, tends to darken the color of the product and reduces the value of the latter.

*Example 7*

|  | Grams |
|---|---|
| Monolinoleic glycerol ester (1 mol.) | 354 |
| Succinic acid do | 118 | are heated gradually; at 175–180° C. the material is clear when hot; at 200–210° it is clear also when cold. The temperature is then raised to 240° C. The reaction proceeds rapidly at this temperature, as is shown by the following decrease in acid number:

| After ½ hour, the acid number is | 58 |
|---|---|
| After 1 hour, the acid number is | 43 |
| After 1½ hours, the acid number is | 36 |
| After 2 hours, the acid number is | 28 |
| After 3½ hours, the acid number is | 17 |

At this point the heating is stopped. The material is a heavy plastic and is soluble in all varnish solvents, such as petroleum thinners and coal tar solvents. The solutions are miscible with other varnish vehicles, resin solutions, oil varnishes, varnish oils, etc.

*Example 8*

|  | Grams |
|---|---|
| Dilinoleic glycerol ester (2 mols) | 1232 |
| Succinic acid (1 mol.) | 118 | are heated as indicated in Example 7. After one hour at 240° C., the acid number is 20, and is reduced to 10 in four (4) more hours of heating. The heating is continued until the desired viscosity is obtained. In its solubility and compatibility with other varnish products the resin is similar to that obtained according to Example 7.

The dilinoleic acid ester is made in a manner similar to the manufacture of the mono-ester, except that twice as much acid is employed.

From the above it will be seen that by the present invention there is imparted oil-solubility to the oil-insoluble resins obtainable by reaction, for example, of glycerol, a relatively high proportion of a polybasic aliphatic acid and a relatively low proportion of phthalic acid, or of glycerol and a polybasic aliphatic acid, by chemical union with a fatty oil or fat acid in such manner that a homogeneous resin is obtained. While it is known to convert an oil-insoluble glycerol-phthalic acid resin into an oil-soluble resin by the use of a fatty oil acid, the present invention for the first time, so far as known to me, solves the problem of producing commercial, oil-compatible resins of the glycerol-polybasic acid type in which the proportions of the reacting materials are such as to produce non-homogeneous, and hence for the paint and varnish industry quite useless, masses upon reaction according to known procedures.

In each of the above examples it is important to stir vigorously, either mechanically or by a current of neutral gas.

The reactions described above may be carried out in the presence of a substantially neutral extending agent which does not take part in the reaction, such extending agent serving to reduce the cost of the product. Suitable extending agents are the drying and non-drying oils commonly used in varnish manufacture, such as linseed oil, China-wood oil, soya bean oil, castor oil, cottonseed oil, menhaden oil, etc. the substantially neutral glycerol esters of fresh and fossil resins, the substantially neutral mixed glycerol esters of fatty oil acids and natural resin acids, etc.

It is to be understood that where in the appended claims I speak of dibasic or polybasic acids, specifically phthalic, maleic and succinic acids, I include the anhydrides of these acids as equivalents.

I claim:

1. The method which consists in reacting essentially 1 mol. of glycerol with 1 to 2 mols of an acid obtainable from the group consisting of fatty oils and fats until a product of low acid number is obtained, and then reacting the so partially esterified glycerol with approximately ¼ to ¾ mol. of a polybasic aliphatic acid and approximately 1/12 to ¼ mol. or less of phthalic acid until a homogeneous, oil-soluble resin is obtained.

2. The method which consists in reacting essentially 1 mol. of glycerol with 1 to 2 mols of a drying oil acid until a product of low acid number is obtained, and then reacting the so partially esterified glycerol with approximately ¼ to ¾ mol. of maleic acid and approximately 1/12 to ¼ mol. or less of phthalic acid until a homogeneous, oil-soluble resin is obtained.

3. The process which consists in reacting essentially 1 mol. of glycerol with 1 to 2 mols of a drying oil acid until a product of low acid number is obtained, and then reacting the so partially esterified glycerol with approximately ¼ to ¾ mol. of succinic acid and approximately 1/16 to 1/6 mol. or less of phthalic acid until a homogeneous, oil-soluble resin is obtained.

4. The method which comprises reacting 1 mol. of glycerol with at least about 1 mol. but considerably less than 3 mols of a monobasic acid obtainable by hydrolysis of a member of the group consisting of fatty oils and fats until a product of low acid number is obtained, and then reacting the so partially esterified glycerol with a quantity of phthalic acid and a polybasic aliphatic acid, said latter two acids being in such relative proportions as would produce two immiscible layers upon simultaneous reaction with the glycerol and the first-named acid.

5. The method which comprises reacting 1 mol. of glycerol with at least about 1 mol. but considerably less than 3 mols of a monobasic acid obtainable by hydrolysis of a member of the group consisting of fatty oils and fats until a product of low acid number is obtained, and then reacting the so partially esterified glycerol with a quantity of phthalic acid and maleic acid, said latter two acids being in such relative proportions as would produce two immisscible layers upon simultaneous reaction with the glycerol and the first-named acid.

6. The method which comprises reacting 1 mol. of glycerol with at least about 1 mol. but considerably less than 3 mols of a monobasic acid obtainable by hydrolysis of a member of the group consisting of fatty oils and fats until a product of low acid number is obtained, and then reacting the so partially esterified glycerol with a quantity of phthalic acid and succinic acid, said latter two acids being in such relative proportions as would produce two immiscible layers upon simultaneous reaction with the glycerol and the first-named acid.

7. The method according to claim 4 wherein the molecular ratio of the polybasic aliphatic acid to the phthalic acid is from approximately 3 to infinity.

8. The process according to claim 5 wherein the molecular ratio of the maleic acid to the phthalic acid is from approximately three to infinity.

9. The method which comprises reacting 1 mol. of glycerol with at least about 1 mol. but considerably less than 3 mols of a monobasic acid obtainable by hydrolysis of a member of the group consisting of fatty oils and fats until a product of low acid number is obtained, and then reacting the so partially esterified glycerol with 1 or more polybasic organic acids at least one of which is a dibasic aliphatic acid, the amount of such polybasic acid or acids being such as would produce two immiscible layers on simultaneous reaction with the glycerol and first-mentioned acid.

10. The method which comprises converting a quantity of glycerol substantially completely to the mono-ester of a drying oil acid, and then reacting such mono-ester with one or more polybasic organic acids at least one of which is a dibasic aliphatic acid, the amount of such polybasic acid or acids being such as would produce two immiscible layers on simultaneous reaction with the glycerol and the drying oil acid.

11. A homogeneous, oil-soluble, fusible resin consisting essentially of the reaction product of (1) the product obtained by esterifying 1 mol. of glycerol with at least about 1 mol. but considerably less than 3 mols of a monobasic acid obtainable by hydrolysis of a member of the group consisting of fatty oils and fats, and (2) one or more polybasic organic acids at least one of which is a dibasic aliphatic acid, the amount of such polybasic acid or acids being such as would produce a non-homogeneous mass on simultaneous reaction with the glycerol and the fatty oil or fat acid.

12. A homogeneous, oil-soluble, fusible resin consisting essentially of the reaction product of (1) the product obtained by esterifying 1 mol. of glycerol with at least about 1 mol. but considerably less than 3 mols of a drying oil acid, and (2) one or more polybasic organic acids, at least one of which is a dibasic aliphatic acid, the amount of such polybasic acid or acids being such as would produce a non-homogeneous mass on simultaneous reaction with the glycerol and the drying oil acid.

13. A homogeneous, oil-soluble, fusible resin comprising the reaction product of (1) the product obtained by esterifying 1 mol. of glycerol with at least about 1 mol. but considerably less than 3 mols of a monobasic acid obtainable by hydrolysis of a member of the group consisting of fatty oils and fats, (2) a dibasic aliphatic acid of the group consisting of maleic, succinic, and malic acids, and (3) phthalic acid, the latter two acids being present in such relative proportions as would produce a non-homogeneous mass upon simultaneous reaction with the polyhydric alcohol and the first named acid.

14. A resin as set forth in claim 13 wherein the dibasic aliphatic acid is maleic acid.

15. A resin as set forth in claim 13 wherein the dibasic aliphatic acid is succinic acid.

16. A resin as set forth in claim 13 wherein the ratio of the dibasic aliphatic acid to the phthalic acid is approximately 3 or more to 1.

17. A homogeneous, oil-soluble, fusible resin comprising the reaction product of (1) the low acid number product obtained by reacting 1 mol. of glycerol with 1 to 2 mols of an acid obtainable by hydrolysis of a member of the group consisting of fatty oils and fats, (2) ¼ to ¾ mol. of a dibasic aliphatic acid which when heated simultaneously with the glycerol and the fatty oil acid or fat acid yields a non-homogeneous mixture, and (3) approximately 1/12 to ¼ mol. or less of phthalic acid.

18. A homogeneous, oil-soluble, fusible resin comprising the reaction product of (1) the low acid number product obtained by reacting 1 mol. of glycerol with 1 mol. of a drying oil acid, (2) ¼ to ¾ mol. of maleic acid, and (3) 1/12 to ¼ mol. or less of phthalic acid.

19. The method as set forth in claim 4 wherein the final reaction takes place in the presence of an extending agent which is compatible with the resinous reaction product.

20. The method as set forth in claim 2, wherein the final reaction takes place in the presence of an extending agent which is compatible with the resinous reaction product.

ISRAEL ROSENBLUM.